June 14, 1960  F. R. WEYMOUTH, JR  2,940,109
WINDSHIELD CLEANING SYSTEM
Filed Oct. 29, 1956  2 Sheets-Sheet 1
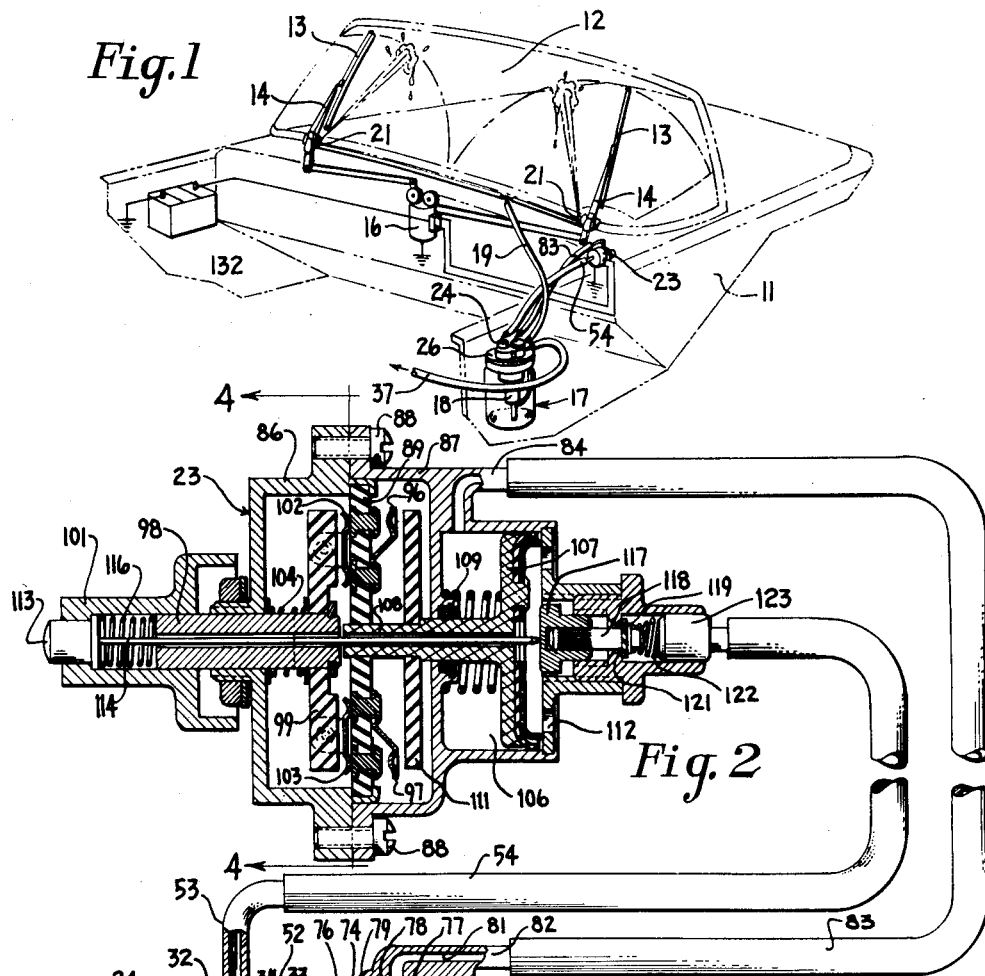
INVENTOR.
FREDERICK R. WEYMOUTH JR.
BY
Bean Brooks Buckley & Bean
ATTORNEYS June 14, 1960  F. R. WEYMOUTH, JR  2,940,109
WINDSHIELD CLEANING SYSTEM
Filed Oct. 29, 1956  2 Sheets-Sheet 2

INVENTOR.
FREDERICK R. WEYMOUTH JR.
BY
Bean Brooks Buckley + Bean
ATTORNEYS

United States Patent Office 2,940,109
Patented June 14, 1960

2,940,109
WINDSHIELD CLEANING SYSTEM

Frederick R. Weymouth, Jr., Buffalo, N.Y., assignor to Trico Products Corporation, Buffalo, N.Y.

Filed Oct. 29, 1956, Ser. No. 618,804

9 Claims. (Cl. 15—250.02)

This invention relates to windshield cleaning systems and more particularly to a windshield cleaning system having an electrically operated wiper motor and a vacuum powered washer fluid pump, said motor and pump being coordinated for operation in a certain predesignated manner.

It is becoming common practice in motor vehicles of current design to install windshield cleaner systems which contribute greatly toward safer vehicle operation by eliminating the hazards associated with dirty windshields. Many types of windshield washer systems have been devised and are in current usage. The present invention is concerned with the application of a washer system to a motor vehicle employing an electrically powered wiper motor, and having a vacuum operated fluid pump, wherein the operation of the wiper motor and fluid pump is coordinated to obtain automatic operation in a predesignated manner. The present invention represents an improvement in such types of windshield cleaner systems and is characterized by a simplified control means which provides reliable and effective coordinated washer and wiper operation. The control means of the invention also provides for the independent control of the wiper motor when it is desired to perform wiping operation independently of washer operation.

The main object of this invention is to provide an improved windshield washer system for use on motor vehicles having an electrically powered wiper motor and a vacuum powered washer fluid pump.

A further object of this invention is to provide a control means which provides wiper motor operation independently of washer pump operation.

Another object of this invention is to provide a washer-wiper system which is reliable and efficient in operation.

These and further objects and features of the invention will become more apparent from the following description and the accompanying drawings wherein:

Fig. 1 is a fragmentary perspective view of a motor vehicle having a washer-wiper system embodying the principles of the invention;

Fig. 2 is an enlarged cross-sectional view of a control element used in the system of the invention;

Fig. 3 is an enlarged cross-sectional view of a coordinating mechanism used with a washer fluid pump included in the system of the invention;

Figure 4:
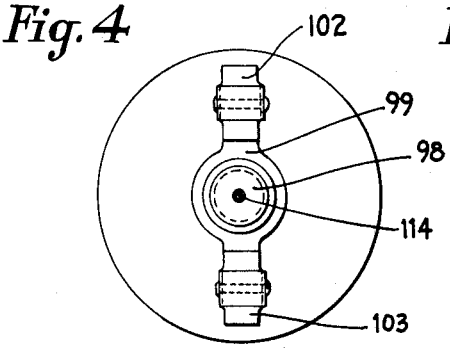
Fig. 4 is a section view as seen from line 4—4 in Fig. 2.
Figure 5:
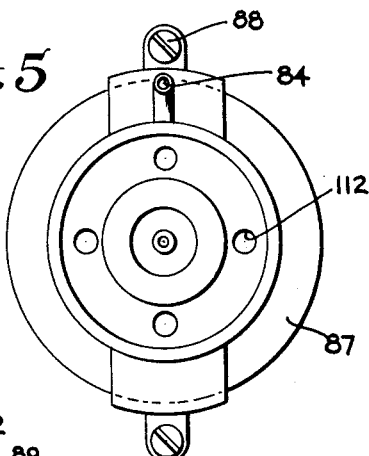
Fig. 5 is an end view of the control element as shown in Fig. 2.

Referring now to the drawings and more particularly to Fig. 1, the numeral 11 identifies a motor vehicle having a windshield 12 on which are arranged a pair of wiper blades 13 movable over predesignated areas by wiper arms 14 mounted for oscillating motion by means of an electrically powered wiper motor 16, all in the usual manner. A windshield cleaning system arranged for the coordinated washing and wiping of the windshield, includes a reservoir assembly 17, having a pump unit 18 which is vacuum powered to provide a predesignated quantity of cleaning fluid to be ejected upon the windshield via hose or conduit 19, and jet means 21.

The pump unit 18 includes a spring loaded piston 22 arranged for movement in one direction as a result of pressure differential caused by completion of a vacuum circuit to charge the pump with liquid, and movement in the opposite direction by expansive action of a spring means when the vacuum circuit is broken to discharge the liquid in the pump. For further description of a vacuum operated pump of such type, reference is had to Patent No. 2,649,332, issued August 18, 1953.

A control assembly 23, forming the main part of the invention and adapted for the control of the wiper motor 16 and the coordinated operation of the reservoir assembly 17, is arranged in the vehicle for convenient manipulation by the vehicle operator.

The reservoir assembly includes a coordinator unit 24 mounted on a reservoir cover 26, which unit is adapted to coordinate the operation of the pump 18 and the wiper motor 16 to achieve a complete windshield cleaning cycle. The coordinator unit 24, which is more fully described in copending patent application Serial No. 530,970, filed August 29, 1955, now Patent No. 2,877,486, comprises a top section 27, a bottom section 28, and a top and bottom intermediate section 29 and 31 respectively, said four sections being held together by suitable fastening means (not shown).

A vacuum chamber 32, formed within the top section and top intermediate section, is divided by a diaphragm 33 supporting a plunger 34 for limited downward movement. The vacuum chamber 32 is connected by a passageway 36 with a hose or conduit 37 leading to a vacuum source, such as the engine intake manifold. A chamber 38, formed within the top intermediate section and the bottom intermediate section, contains a diaphragm 39 which is engaged by the end of the plunger 34 on the top surface, and by the end of a spacer 41 on the bottom surface. The chamber 38 opens into an atmospheric chamber 42 providing a venting of the pump piston chamber to atmosphere via port means 43, clearance around the spacer 41, and chamber 38. A valve 44, supported on the spacer 41, is arranged to engage a seat 46 to cut off said venting of the pump piston chamber to atmosphere when the spacer is moved downwardly. A compression spring 47, surrounding the spacer and engaging the valve 44 at one end, maintains the end of the spacer in contact with the bottom of the diaphragm 39. Supported on the opposite end of the spacer is a normally closed valve 48 which covers a circular vacuum recess 49 connected by a passageway 51, to the passageway 36, to thus prevent evacuation of the air in the pump chamber above the piston 22. A vent 52, arranged in the plunger 34, provides for the equalization of pressure on either side of the diaphragm 33. A nipple 53, which connects with the vacuum chamber 32 above the diaphragh 33, is arranged for connection with a hose or conduit 54 which leads to the control assembly 23, and which is adapted for connection of the top portion of chamber 32 to atmosphere for initiation of pump operation.

It will be seen that with vacuum condition existing on each side of the diaphragm 33 in the chamber 32, the various movable parts will be in the position illustrated in Fig. 3, and the region above the pump piston 22 will be connected with the atmosphere. However, admittance of atmospheric pressure to the top portion of the chamber 32 via nipple 53, will cause a pressure differential upon the plunger 34 and the diaphragm 33, resulting in the downward movement of said plunger and the seating of the valve 44. At the same time, the valve 48 will be unseated, thus cutting off the atmospheric connection to the pump chamber above pump piston 22, and connecting the pump piston chamber with a source of vacuum via the recess 49, passageways 51, 36, and the hose 37. As a result thereof, the pump piston 22 will be forced upwardly in the pump chamber and a given charge of cleaning liquid will be drawn into the pump unit.

As the pump piston 22 approaches the end of its upward movement, it will engage the end of the spacer 41 and cause upward movement thereof resulting in the seating of the valve 48 and the unseating of the valve 44. Such action will result in the connection of the upper part of the pump piston chamber with atmosphere in the manner as above described. The upward movement of the pump piston resulted in the compression of a spring 56, which can now expand and force the piston downwardly, whereupon liquid will be ejected from the pump unit into a hose or conduit 57 and into a passageway 58 formed in a nipple 59 provided in the bottom section 28. Said liquid flow will continue past a flap type check valve 61, and into a passageway 62 of a nipple 63 formed in the bottom intermediate section 31, and then into the hose 19 for delivery to the surface of the windshield. A portion of the liquid flow in the passageway 58 will be diverted into a passageway 64 and will flow past a check valve 66, entering a hydrostatic chamber 67 to build up hydrostatic pressure acting against the bottom of a diaphragm 68. The hydrostatic chamber 67 is formed in the bottom intermediate section, while opposite and on the other side of the diaphragm 68, is formed an atmospheric chamber 69 which is vented to atmosphere by a passageway 71. A bleed screw and passageway arrangement (not shown) is provided for the controlled flow of liquid from the hydrostatic chamber 67 back into the passageway 64, thus providing a time control for the release of hydrostatic pressure in the chamber 67.

A chamber 72, formed in the top section 27 and opposite the chamber 69, is connected by a passageway 73 to the vacuum passageway 36, the end of the passageway 73 being normally closed by a valve 74. Chamber 72 is vented to atmosphere through a notch 76 formed in the wall of the seat supporting the valve 74, and about the stem of a valve lifter 77 into the atmospheric chamber 69. The lower end of the valve lifter 77 is arranged to rest upon the diaphragm 68, while the opposite end is pointed for entry into an elastic sleeve member 78. Compressively arranged between the elastic sleeve 78 and the valve 74 is a helical spring 79 which normally keeps the valve seated tightly upon the open end of the passageway 73. The elastic sleeve 78 is positioned in alignment with a passageway 81 formed in a nipple 82 to which is affixed a hose or conduit 83 leading to and connected with a nipple 84, formed on the control assembly 23. The sleeve 78 acts as a valve against the pointed end of the valve lifter 77 to seal off air flow into the hose 83 during extreme pressure fluctuations which might otherwise dissipate the vacuum in said hose. The sleeve being elastic and distensible, will readily permit air flow from the hose 83 but not in a reverse air flow.

It will be seen that in the normal, or non-operative position of the parts above described, the valve 74 will be seated and atmospheric pressure will exist in the chamber 69, chamber 72 and hose 83. As the pump unit 18 is caused to operate to discharge a given quantity of liquid, hydrostatic pressure will be built up in the chamber 67 causing an upward movement of the valve lifter 77, compressing the spring 79 to make connection of the chamber 72 with the source of vacuum via passageways 73 and 36. Upward movement of the valve lifter 77 will terminate when the enlarged head thereof engages the top surface of the atmospheric chamber 69, thus cutting off connection of the chamber 72 with atmosphere. Vacuum conditions will thus be maintained in the hose 83 until the hydrostatic pressure in the chamber 67 drops sufficiently to allow a reseating of the valve 74 which will again connect the chamber 72 with atmosphere. The rate of decrease in hydrostatic pressure in the chamber 67 may be controlled by adjustment of the bleed screw so that vacuum condition in hose 83 can be maintained for a prolonged period of time after completion of liquid spray upon the windshield. The reason for providing maintenance of vacuum condition in the hose 83, is to prolong operation of the wiper motor 16 after completion of liquid spray so that the wiper blades will wipe the windshield dry. Such motor control action is a function of the control assembly 23, which will now be described.

Figure 6:
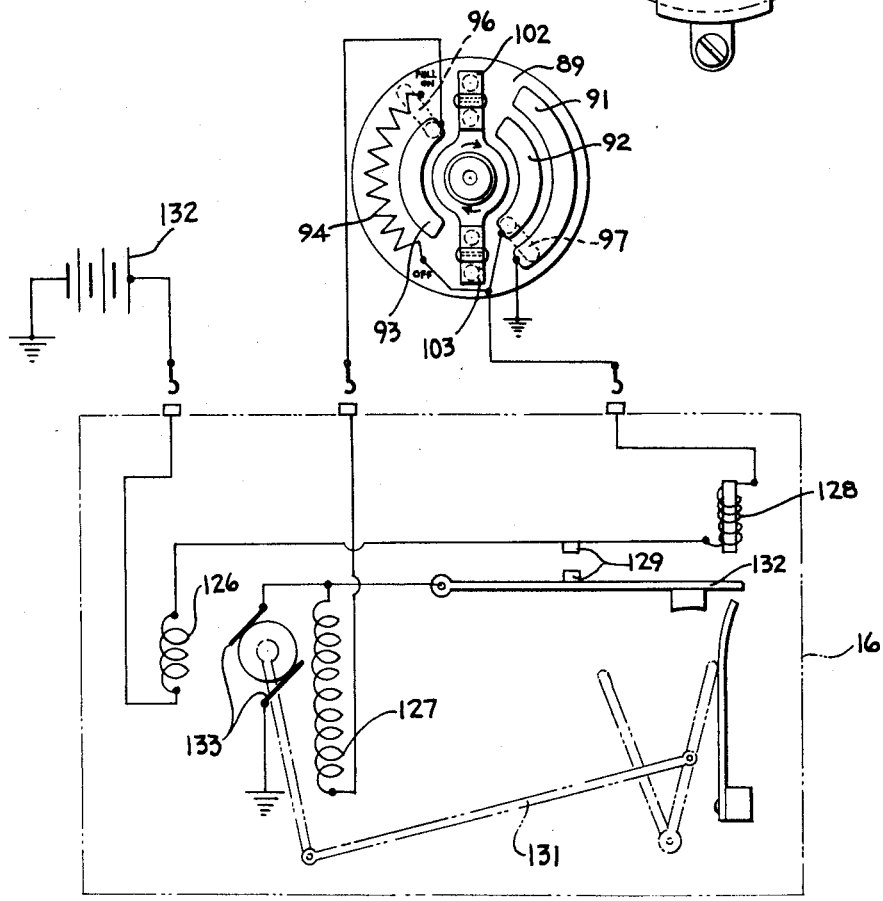
Fig. 6 is a schematic diagram illustrating the electrical circuit used in the system of the invention.

The control assembly 23 includes a cylindrical front housing 86 and a cylindrical rear housing 87 held together by fastening means such as screws 88. Supported within the rear end of the front housing is a plate 89 formed of an electrical insulating material on which are concentrically arranged sliding electrical conducting contacts 91, 92, 93, and variable resistance 94, as best seen in Fig. 6. A pair of resilient electrical conducting fingers 96 and 97 are arranged on the plate 89, finger 96 being in permanent electrical connection with the end of the sliding contact 93, while finger 97 is in permanent electrical connection with the end of sliding contact 92. The free end of resilient finger 96 is arranged for movable electrical contact with the end of the resistance 94, while the free end of the resilient finger 97 is arranged for movable electrical contact with the end of sliding contact 91. Supported in the front housing 86 for axial and rotatable movement, is a shaft 98 the inner end of which has secured thereto an electrical insulating plate 99, the outer end of which has affixed thereupon a control knob 101 adapted for the rotary adjustment of the shaft 98. A pair of electrical conducting fingers 102 and 103 are pivotally attached to the plate 99, finger 102 being arranged for sliding engagement with the contacts 91 and 92, while finger 103 is arranged for sliding engagement with contact 93 and variable resistance 94. A helical spring 104, surrounding the shaft 98, is compressively arranged between the inside of the front housing 86 and the plate 99 to urge the fingers 102 and 103 in slidable engagement with the contacts 91, 92, 93, and variable resistance 94.

On the back surface of the rear housing 87 is formed a vacuum chamber 106 in which is slidably arranged a piston 107 having a piston shaft 108 that extends forwardly through the plate 89 for engagement with the end of the shaft 98. A helical spring 109, positioned in the vacuum chamber 106, surrounds the shaft 108 and is compressively arranged between the end of the vacuum chamber and the side of the piston 107 to urge the latter rearwardly in the vacuum chamber.

The piston shaft 108 supports an electrical non-conducting plate 111 arranged for engagement with the free ends of the fingers 96 and 97. The rear end of the vacuum chamber 106 is open to atmosphere by means of holes 112, to provide a pressure differential upon the piston 107 when vacuum pressure is provided in the vacuum chamber 106 on the inner side of the piston 107. It will be seen that such a pressure differential will cause movement of the piston 107 resulting in the axial shifting of the shaft 98 by reason of engagement of shaft 108, thus moving the electrical fingers 102 and 103 out of engagement with contacts 91, 92, 93, and variable resistance 94, and causing the plate 111 to force the fingers 96 and 97 into engagement with the end of resistance 94 and contact 91 respectively.

Positioned for axial movement within the knob 101 is a button 113, the inner end of which is arranged for abutment with a rod 114 rotatably supported within the shafts 98 and 108. A helical spring 116 is compressively arranged between the inner end surface of the button 113 and the end of the shaft 98. The outer end of the rod 114 is maintained in abutment with a cap 117 affixed to the end of a stem 118 supporting a valve 119 normally arranged in abutment upon a seat 121. The valve 119 is maintained in seated engagement by means of a helical spring 122 which is compressively arranged between the valve 119 and a nipple fitting 123 to which hose 54 is attached. It will be seen that when the button 113 is depressed, the rod 114 will move the cap 117 and stem 118 axially to unseat the valve 119 and allow air flow under atmospheric pressure to pass from the holes 112 into the hose 54.

The control assembly 23 may be adapted for use with an electric motor having an electrical circuit such, for example, as illustrated in Fig. 6. The motor 16 has an armature winding 126, and a field winding 127 in circuit with the variable resistance 94. The armature circuit includes a solenoid 128, which when activated, causes closing of contacts 129. A parking linkage arrangement, as generally illustrated by numeral 131, is adapted for opening the circuit in the field winding after the wiper motor has moved the wiper blades 13 to parked position to shut off the motor. It will be seen that when the control knob 101 is rotated to cause the conducting finger 103 to establish a circuit between the contact 93 and the end of the variable resistance 94, the conducting finger 102 will be caused to establish electrical circuit between the contacts 91 and 92, current will flow from a battery 132, through the armature winding 126, solenoid 128, contact 92, finger 102, contact 91 to ground. The solenoid 128, being energized, will draw the lever 132 to close electrical contacts 129 thereby continuing electrical circuit from the armature winding 126, across the armature brushes 133 to ground, and also through the field winding 127, contact 93, conducting finger 103, part of the variable resistance 94, to contact 92, through conducting finger 102, and contact 91, to ground, thus energizing the wiper motor. As the control knob 101 is rotated, a greater proportion of the variable resistance 94 will be added to the field winding circuit, resulting in increasing the speed of wiper motor operation until a maximum, or "full on" position, is realized. The use of the control knob 101 is intended for the sole operation of the wiper motor.

When it is desired to perform a windshield wiping and washing operation, it is only necessary to depress the button 113. Such action will initiate a complete washer and wiping operation as follows:

Axial movement of the rod 114, as a result of depression of button 113, will unseat the valve 119 allowing flow of air under atmospheric pressure into the hose 54 and into the vacuum chamber 32 on the top side of the diaphragm 33. The resulting pressure differential acting upon the diaphragm 33 will cause downward movement of the plunger 34 and result in the pumping of a given quantity of cleaning liquid, which will be sprayed upon the windshield, in the manner as has been set forth in detail heretofore. During the spraying of liquid upon the windshield, hydrostatic pressure will be built up in the chamber 67 to unseat the valve 74 and connect the hose 83 to a source of vacuum in the manner as also above described. Vacuum condition will thus be established in the vacuum chamber 106 of the control assembly, resulting in a pressure differential upon the piston 107 and the movement of the latter to cause electrical contacts of the fingers 96 and 97, and disruption of the electrical contact of the fingers 102 and 103. In such position of the movable elements of the control assembly, electrical circuit will be completed from the battery through the armature winding 126, solenoid 128, contact 92, finger 97, contact 91, to ground. Energization of solenoid 128 will move the lever 132 to engage the contacts 129 to complete the circuit from the armature winding 126, across the armature brushes 133 to ground, and also through the field winding 127, contact 93, finger 96, through the full length of the variable resistance 94, to the contact 92, finger 97, and contact 91 to ground.

As a result, the wiper motor will be operated at high speed during the remainder of the liquid spraying operation, and for a period after cessation of the liquid spraying operation. Wiper motor operation will be continued while the hydrostatic pressure in the chamber 67 is gradually reduced by the liquid bleeding process, which in due course will result in the seating of the valve 74 and the connection of the chamber 72 with atmosphere to provide flow of air, under atmospheric pressure, in the hose 83, as heretofore described. Flow of atmospheric pressure from hose 83 into the control assembly chamber 106, will result in the equalization of pressure on each side of the piston 107, whereupon the spring 109 will move the piston rearwardly to non-operative position, following which the electrical circuit contacts in the control assembly will be returned to their pre-interrupted condition.

It is to be noted that if the wiper motor was not being operated when a windshield washer and wiping cycle was initiated, the motor will be returned to non-operative position upon completion of such cycle; and if the wiper motor had been operating at some speed, dependent upon the adjustment of the control knob 101, prior to initiation of a washing and wiping cycle, the motor will automatically be returned to continue operation at the said speed.

From the foregoing it will be seen that the stated objectives of the invention can be realized in a reliable and efficient manner by application of the principles of the invention as set forth in detail hereinabove.

The foregoing description has been given in detail without thought of limitation since the inventive principles involved are capable of assuming other physical embodiments without departing from the spirit of the invention and the scope of the appended claims.

What is claimed is:

1. A windshield cleaning system comprising in combination an electrically powered wiper motor, a reservoir assembly having a pressure fluid responsive pump unit operable to discharge a given quantity of cleaning fluid for use upon the windshield, a coordinator unit operable to provide operation of the pump unit and concurrently therewith operation of the wiper motor and to maintain operation of the wiper motor after cessation of pump unit operation, and a common control assembly arranged to initiate the independent operation of the wiper motor and to initiate operation of the coordinator unit to in turn initiate concurrent operation of the pump unit and the wiper motor.

2. A vehicle windshield cleaning system comprising in combination an electrically powered wiper motor, a reservoir assembly having a vacuum powered pump unit operable to discharge a given quantity of cleaning fluid for use upon the windshield, a coordinator unit mounted upon the reservoir assembly and operable to provide operation of the pump unit and concurrently therewith operation of the wiper motor and to maintain operation of the wiper motor after cessation of pump operation, and a common control assembly positioned for convenient use by the vehicle operator, said control assembly having means for the independent operation of the wiper motor and further means to initiate operation of the coordinator unit to in turn initiate concurrent operation of the pump unit and the wiper motor.

3. A vehicle windshield cleaning system comprising in combination an electrically powered wiper motor, a reservoir assembly having a pump unit responsive to a pressure differential to charge the pump unit with a given quantity of cleaning liquid and having a resilient means actionable after termination of said pressure differential to eject said cleaning liquid for use upon the windshield, a coordinator unit mounted upon the reservoir assembly and operable to initiate operation of the pump unit and of the wiper motor concurrently therewith, and a common control assembly positioned for convenient use by the vehicle operator, said control assembly having means to initiate independent operation of the wiper motor and further means arranged to cause operation of the coordinator unit to in turn cause concurrent operation of the pump unit and the wiper motor.

4. A vehicle windshield cleaning system comprising in combination an electrically powered wiper motor, a reservoir assembly having a pump unit responsive to a pressure differential to charge the pump with a given quantity of cleaning liquid and having resilient means actionable after termination of said pressure differential to eject said cleaning liquid for use upon the windshield, a pressure fluid responsive coordinator unit mounted upon the reservoir assembly and operable to initiate concurrent operation of the pump unit and the wiper motor and to continue operation of the wiper motor for a predetermined time after cessation of pump operation, and a control assembly positioned for convenient use by the vehicle operator, said control assembly having electrical circuit means to initiate operation of the wiper motor independently of the pump unit and having pressure fluid control means arranged to cause operation of the coordinator unit.

5. In a vehicle windshield cleaning system including an electrically powered wiper motor and a reservoir assembly having a vacuum operated pump unit adapted for the discharge of a given quantity of cleaning liquid for spraying predesignated areas of the windshield, a control assembly arranged for convenient manual use by the vehicle operator and having first electrical circuit means for controlling operation of the wiper motor independently of said pump unit and pressure fluid responsive means connectable with said reservoir assembly, said pressure fluid responsive means being adapted for the disruption of said first electrical circuit means controlling independent operation of the wiper motor and being further adapted for the establishment of second electrical circuit means providing wiper motor operation concurrent with the operation of the pump unit.

6. In a vehicle windshield cleaning system including an electrically powered wiper motor and a reservoir assembly having a vacuum operated pump unit adapted for the discharge of a given quantity of cleaning liquid for spraying predesignated areas of the windshield, a control assembly arranged for convenient manual use by the vehicle operator, said control assembly having rotatable means including an electrical circuit means adapted to provide variable speed motor operation, and having means to initiate operation of said pump unit and further means including a fluid pressure differential arrangement connectable with said reservoir assembly and adapted for the disruption of said electrical circuit means and for the establishment of electrical circuits to provide high speed wiper motor operation during operation of said pump unit and for a predesignated time thereafter.

7. In a vehicle windshield cleaning system including an electrically powered wiper motor and a reservoir assembly having a vacuum operated pump unit adapted for the discharge of a given quantity of cleaning liquid for spraying predesignated areas of the windshield, a control assembly arranged for convenient manual use by the vehicle operator, said control assembly having a rotatable and axially movable shaft, a plate containing electrical circuit elements, means affixed to the shaft including electrical circuit completing members positionable for providing variable speed motor operation, axially movable means to initiate pump unit operation, piston means responsive to pressure fluid differential and having an axially movable shaft engageable with said first mentioned shaft for disruption of the electrical circuits providing variable speed motor operation, and a plate means affixed to the second mentioned axially movable shaft and adapted upon piston movement to establish electrical circuits providing high speed wiper motor operation, said piston means arranged for operation during pump unit operation and for a predesignated time thereafter.

8. A control assembly comprising a pair of cylindrical housing members secured together to enclose an electrical insulating plate member, electric contact elements secured to the plate member, one of said elements providing a variable resistance connectable in a field winding circuit of a motor, a shaft supported for rotatable and axial movement in the first of said housing members, a knob for rotation of said shaft, the second of said motor housings being formed to provide a piston chamber, a shaft affixed to the piston and projecting through the plate member for engagement with the first mentioned shaft, an axially movable button supported in the knob, rod means projecting axially through said shafts one end arranged in abutment with said button the other end arranged in abutment with a valve means movable to admit flow of air under atmospheric pressure through said piston chamber on one side of the piston, means to connect the opposite side of the piston chamber with a source of vacuum, electrical conducting elements arranged for slidable engagement with the contact elements and being supported for rotary motion by said first mentioned shaft, and fingers mounted upon said plate member and arranged for establishment of electrical circuits through the contact elements when said electrical conducting elements are displaced from the contact elements.

9. A control assembly comprising first and second cylindrical housing means affixed together to enclose an electrical insulating plate member, electrical conducting contacts arranged concentrically upon one side of the plate member, one of said contacts forming a variable resistance for motor speed regulation, shaft means supported in the first housing member for rotary and axial movement and having affixed to the inner end thereof an electrical insulating plate supporting a pair of electrical conducting fingers, resilient means adapted to bear against said finger supporting plate to maintain said fingers in slidable engagement with said conducting contacts to regulate electric current flow through the control assembly, a control knob mounted on the outer end of the shaft for relative axial movement therewith, a button operatively supported by the knob for axial movement, a piston chamber formed in the housing member opposite to that from which the shaft projects, piston means slidably arranged in the chamber and having a shaft adapted for axial engagement with said first mentioned shaft, a valve means being normally seated to prevent flow of air under atmospheric pressure through the back end of said chamber, a rod movable by said button to unseat said valve means to allow flow of air under atmospheric pressure through the back end of said chamber, a resilient means adapted to urge the piston toward the back end of the chamber, and an electrical insulating plate affixed to the piston shaft for engagement with finger means affixed to the first mentioned plate member to complete an electrical circuit through the conducting contacts and the full length of the variable resistance when the pair of electrical conducting fingers are moved out of engagement with the electrical conducting contacts.

References Cited in the file of this patent

UNITED STATES PATENTS

| | | |
|---|---|---|
| 2,743,473 | Oishei | May 1, 1956 |

FOREIGN PATENTS

| | | |
|---|---|---|
| 736,380 | Great Britain | Sept. 7, 1955 |